(12) United States Patent
Detty (10) Patent No.: US 10,362,363 B2
(45) Date of Patent: Jul. 23, 2019

(54) METHODS AND APPARATUS FOR PROVIDING PROGRAM CHANNEL STATUS INFORMATION AND/OR FOR CONTROLLING CHANNEL SWITCHING

(71) Applicant: Time Warner Cable Enterprises LLC, St. Louis, MO (US)

(72) Inventor: Michael Detty, Broomfield, CO (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 0 days.

(21) Appl. No.: 14/535,046

(22) Filed: Nov. 6, 2014

(65) Prior Publication Data

US 2016/0134937 A1    May 12, 2016

(51) Int. Cl.
*H04N 21/44* (2011.01)
*H04N 21/81* (2011.01)
*H04N 21/438* (2011.01)
*H04N 21/442* (2011.01)
*H04N 21/472* (2011.01)
*H04N 21/482* (2011.01)
*H04N 21/488* (2011.01)

(52) U.S. Cl.
CPC ....... *H04N 21/812* (2013.01); *H04N 21/4383* (2013.01); *H04N 21/44008* (2013.01); *H04N 21/44222* (2013.01); *H04N 21/472* (2013.01); *H04N 21/482* (2013.01); *H04N 21/4882* (2013.01)

(58) Field of Classification Search
CPC .............. H04N 21/812; H04N 21/482; H04N 21/44222; H04N 21/4383; H04N 21/4312; H04N 21/4316; H04N 21/4821; H04N 21/44008; H04N 21/4882; H04N 21/472

See application file for complete search history.

(56) References Cited

U.S. PATENT DOCUMENTS

| | | | |
|---|---|---|---|
| 2009/0007214 A1* | 1/2009 | Roberts | H04N 5/44543 725/134 |
| 2009/0178078 A1* | 7/2009 | Daigle | H04N 5/44543 725/40 |
| 2012/0222066 A1* | 8/2012 | Charania | H04N 21/44222 725/34 |
| 2013/0014162 A1* | 1/2013 | Chen | H04N 21/4383 725/38 |
| 2013/0346430 A1* | 12/2013 | Tang | G06F 17/30029 707/758 |
| 2014/0331260 A1* | 11/2014 | Gratton | H04N 21/4312 725/40 |

* cited by examiner

*Primary Examiner* — Benjamin R Bruckart
*Assistant Examiner* — Aklil M Tesfaye
(74) *Attorney, Agent, or Firm* — Straub & Straub; Michael P. Straub; Stephen T. Straub (57) ABSTRACT

Methods and apparatus for detecting whether a commercial is ongoing on a program channel and indicating commercial status of a program channel in a program guide are described. Also described are channel surfing methods and apparatus where a user is allowed to automatically skip channels with ongoing commercials and is provided with an indicator of the commercial status on one or more previous program channels while viewing content of program channel to which the user switched.

17 Claims, 9 Drawing Sheets

EXEMPLARY PROGRAM GUIDE WITH AD INDICATORS DISPLAYED AT A FIRST TIME

EXEMPLARY PROGRAM GUIDE WITH AD INDICATORS DISPLAYED AT A FIRST TIME

METHODS AND APPARATUS FOR PROVIDING PROGRAM CHANNEL STATUS INFORMATION AND/OR FOR CONTROLLING CHANNEL SWITCHING

FIELD

The present application relates to methods and apparatus for providing users with program channel status information and/or for controlling channel switching as a function of program channel status information.

BACKGROUND

When watching live TV, many people like to switch between one or more program channels. Typically, when encountering a commercial, e.g., advertisement, they will change channels and view a program to which they switched until the end of the commercial break on the original channel and then change the channel back to what they were previously watching. Sometimes the channel to which they change and/or the channel they were originally watching is also displaying a commercial at the time a channel switch is made. Channel switching and decoding or tuning sometimes taking as long as 5 seconds which can cause a user to end up wasting his/her time flipping between channels. This can be a very frustrating user experience.

Users often tend to want to flip between channels during commercial breaks. Unfortunately, commercials tend to often be displayed as roughly the same time on many channels. Thus as a user flips from one channel to another channel as part of a channel surfing operation initiated on a channel the user was viewing, the user is confronted with yet another commercial. While at least some channels will not be displaying a commercial at the time other channels are displaying commercials, the flipping to one or more channels with commercials being displayed can be frustrating particular when the channel surfing was initiated during an ongoing commercial, e.g., with the objective of avoiding to have to watch a commercial.

In view of the above it should be appreciated that there is a need for methods and apparatus which would facilitate switching between channels and/or channel surfing operation whereby a user can decrease the probability of switching to a channel with a commercial and/or avoid channels with ongoing commercials altogether.

SUMMARY

Methods and apparatus for using information indicating whether or not a commercial is ongoing on a program channels are described. Program channels are monitored to determine whether a commercial is currently ongoing on the program channel or not. Such program channel commercial status information is stored and used in some embodiments to control commercial status information displayed along with program channel information such as the name of an ongoing program. In at least some embodiments when a user selects a guide, in addition to program information the user is presented with an indicator indicating if the program channel has a commercial ongoing at the time the guide is displayed. No indication of an ongoing commercial indicates, in some embodiments, that a commercial is not ongoing. In this manner, a user seeking to perform channel surfing, e.g., during an ongoing commercial break, can be provided with a visual indication of which channels have ongoing commercials thus facilitating avoidance of channels with commercials. The methods and apparatus also facilitate channel surfing, e.g., sequential skipping between channels with the content of individual channels being briefly displayed or output prior to skipping to the next channel.

During a regular channel surfing mode of operation, in response to continued depressing of a channel up or down change control, channels are sequentially displayed irrespective of commercial status on the channel. During a commercial skip channel surfing mode of operation channels which are determined to have an ongoing commercial are skipped and not displayed as part of the channel surfing operation.

A user may signal an indication to use commercial skip surfing mode operation by pressing a button or key, e.g., on a remote control, prior to pressing the channel change up or down buttons. In some embodiments, the commercial skip mode of operation is automatically controlled based on the commercial status of a current program channel being output to a user at the time a channel change up or down arrow key is pressed. In one such embodiment if the commercial status of the current channel indicates that the current channel has a commercial ongoing at the time a channel change up or down selection is made by a user, the commercial skip mode of channel surfing is automatically entered and channels with ongoing commercials are skipped as part of the surfing operation. However, if no commercial is ongoing at the time a channel up or down command is detected, a regular channel surfing mode of operation is implemented for the time period the channel change signal continues to be received, e.g., due to continued depressing of a channel up or down button on a remote control.

A display of the commercial status of previously visited channels is included, in some embodiments, at the bottom of a display screen displaying the program on a currently visited channel. In this manner a user is informed of the commercial status of the channel from which the channel surfing during a commercial break was initiated allowing the user to easily determine when the commercial break on a channel has ended and to switch back in a timely manner.

Numerous additional features and embodiments are discussed in the detailed description which follows.

DETAILED DESCRIPTION

Figure 1:
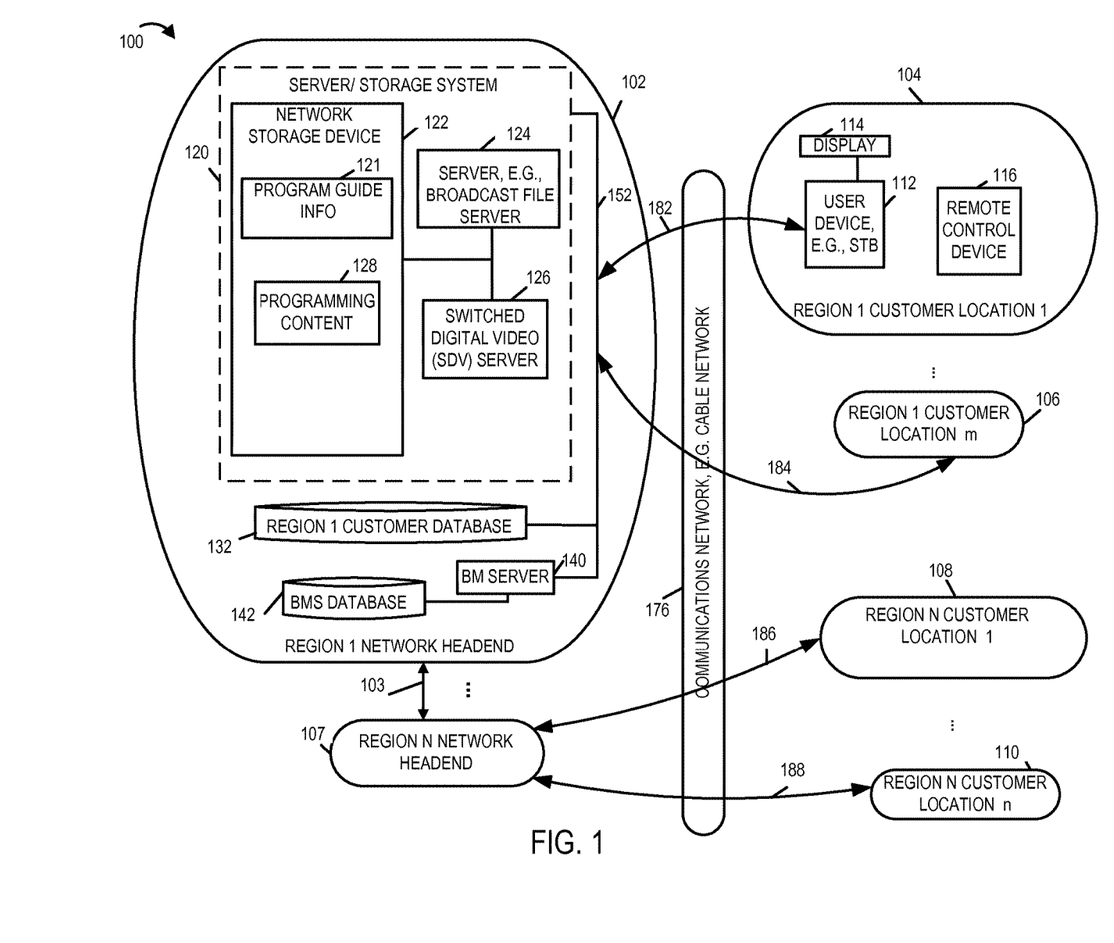
FIG. 1 illustrates an exemplary communications network implemented in accordance with the present invention.

FIG. 1 illustrates an exemplary content delivery and distribution system 100 implemented in accordance with the invention. The system 100 supports the provisioning of content delivery services, as well as user content selection, communication of content and/or other program information to a user device, e.g., set top box, and billing for content provided to customers in accordance with various embodiments of the present invention. Exemplary system 100 includes a plurality of N regional service provider systems in the form of regional headend systems 102, 107. The N regional service provider systems include the first network head end system 102 corresponding to a first region, i.e., Region 1, and a region N service provider system in the form of headend system 107 corresponding to region N.

Each regional service provider system, e.g., region 1 network headend 102, region N network headend 107, provides services, e.g., content delivery services, via communications network 176, to a corresponding set of user devices at customer locations 104, 106, 108, 110 which correspond to the region serviced by the particular headend system. For example, region 1 network headend 102 provides services to the M customer locations 104, 106 corresponding to Region 1 while Region N network headend 107 provides services to region N customer locations 1 through N 108, 110. As should be appreciated the number of customer locations M and N, respectively, will vary depending on the particular region and the number of customer locations in the individual region. The customer location may be, e.g., customer premise such as customer's home, or another place where the customer is using a user device such as a set top box to receive the services, e.g., to view TV programming content. Such places may include hospitals, hotels, restaurants, offices etc. In some embodiments the communications network 176 is, e.g., a hybrid fiber-coaxial (HFC) network, satellite network, and/or internet. In various embodiments the content, e.g., multimedia content, is delivered from the headends over the communications network 176 to one or more devices at the customer locations.

Each of the regional service provider systems such as network headend 102, 104 may be implemented at a cable network office or hubsite serving a plurality of customer locations and includes multiple servers and databases which are coupled together as shown. Region 1 network headend 102 includes a server/storage system 120, a region 1 customer database 132, and a business management (BM) server 140 which in turn is coupled to a BMS (business management system) database 142. The customer database 132 is used to store customer account information, e.g., customer name, address, customer device, e.g., STB, identification information, customer device capability information, and information about customer subscribed services. The business management server database 142 coupled to business management (BM) server 140 includes customer billing information. As should be appreciated the BMS database 142 may be, and in some embodiments is, integrated with the customer database 132. It should be appreciated that some of the servers and/or elements shown to be included in the headend 102 may reside outside the headend 102 in some embodiments and may be located anywhere in the system 100, e.g., in a distributed manner. In the FIG. 1 example, various servers and other elements included in the headend 102 are coupled together by a local network 166.

The server/storage system 120 includes a content server, e.g., a broadcast file server (BFS) 124 and/or an on-demand content server, a switched digital video (SDV) server 126 and a network storage device 122 which are coupled together as shown. Network storage device 122 stores programming content, e.g., audio and video content which may be delivered either as part of a content broadcast by server 124 and/or by the SDV server 126 in response to a user request for content received via network 176 from one or more devices at customer locations 104, 106. The various servers present in the network headend 102 are coupled together via a bus 152 over which they may interchange data and information and which can be used to supply content to the communications network 176 for delivery to various user devices such as STB 112.

The broadcast file server (BFS) 124, among other things, is responsible for delivering, e.g., broadcasting, content including program content and/or other information to one or more customer devices, e.g., set top boxes, which support receiving content by tuning to, e.g., QAM broadcast stream broadcast by the server 124. The switched digital video (SDV) content server 126 provides content and/or other information to one or more customer devices which support receiving SDV content. In various embodiments the content servers 124, 126 access the programming content from the storage device 122 and generate transport streams suitable for delivery to various customer devices via the communications network 176.

As shown in FIG. 1, region 1 customer location 1 104 is coupled to region 1 network headend 102 via communications network 176 which can, and in some embodiments is, implemented as a cable network. Communications link 182 traversing the communications network 176 couples customer device 112 to the region 1 network headend's bus 152. Similarly, devices at region 1 customer location m 106 are coupled to region 1 network headend bus 152 via link 184.

Region N customer location 1 108 is coupled to region N network headend 107 via a communications link 186. Similarly, region N customer location n 110 is coupled to region N network headend 107 via a communications link 188. The network headends 102, 107 of the different regions are coupled together, e.g., via link 103 which may be over a back haul fiber optic network used to connect headend offices 102, 107. Network storage device 122 includes programming content 128 including, e.g., movies, content of regional favorites, content of seasonal favorites, etc., which can the delivered to the customer devices located at the customer locations 104, 106. The delivery of video and/or other content may, and normally is through servers 124 and 126. Network storage device 122 also includes program guide information 121 and broadcast information 125. The program guide information 121 provides channel guide information. This information is communicated to the customer devices and can be used for generating a program guide displayed to a user. The program guide information 121 is shown as being stored in network storage device 122 but may, and in some embodiments is, stored in memory within the servers 124, 126 and communicated to the customer devices, e.g., STBs, via communications network 176. In accordance with one aspect, in some embodiments the program guide information 121 includes information and/or applications that allow a customer device, e.g., STB 112, to generate program guides, e.g., program guides that indicate commercial/advertisement status information that allows determining if an advertisement is ongoing on a listed channel at a given time. Such information and/or applications may be, and in some embodiment is, communicated to one or more devices periodically. However in some embodiments the information 121 is not communicated periodically to all the customer devices in the region 1 but rather upon a request from one or more devices, e.g., STBs.

As will be discussed, in accordance with one feature of some embodiments, the program guide information 121 is used by a customer device to generate an exemplary program guide, to present to the user/customer.

Business management server 140 generates and processes billing information corresponding to region 1 customers, e.g., processing bill payment information, processing discount and/or coupon information, updating billing charge information in response to upgrades, video on demand purchases, and/or other activity.

Referring now to the customer side of system 100. Each customer location in a region may include a plurality of customer premise equipments (CPEs). In various embodiments the CPEs located at the customer locations include, e.g., modems, routers, and user devices including, e.g., set top box, internet capable TVs, personal computers, laptops, tablet devices, smart phones etc. In various embodiments a user device such as a set top box presents the program content to a viewer, e.g., customer/subscriber. FIG. 1 shows some details of customer location 104. Other customer locations 106, 108, 110 may be similar to the customer location 104 and may include same or similar CPEs.

As shown, region 1 customer location 1 104 includes a first set of equipments including, e.g. a set top box (STB) 112 in combination with display 114 and a remote control 116. STB 112 is shown coupled to display 114, which may and in some embodiments is, a television set. However, it should be appreciated that the STB 112 can be integrated in a device which also includes the display 114. The STB 112 may, and often does, include Digital Video Recorder (DVR) functionality, program guide modification and presentation capabilities.

Figure 2:
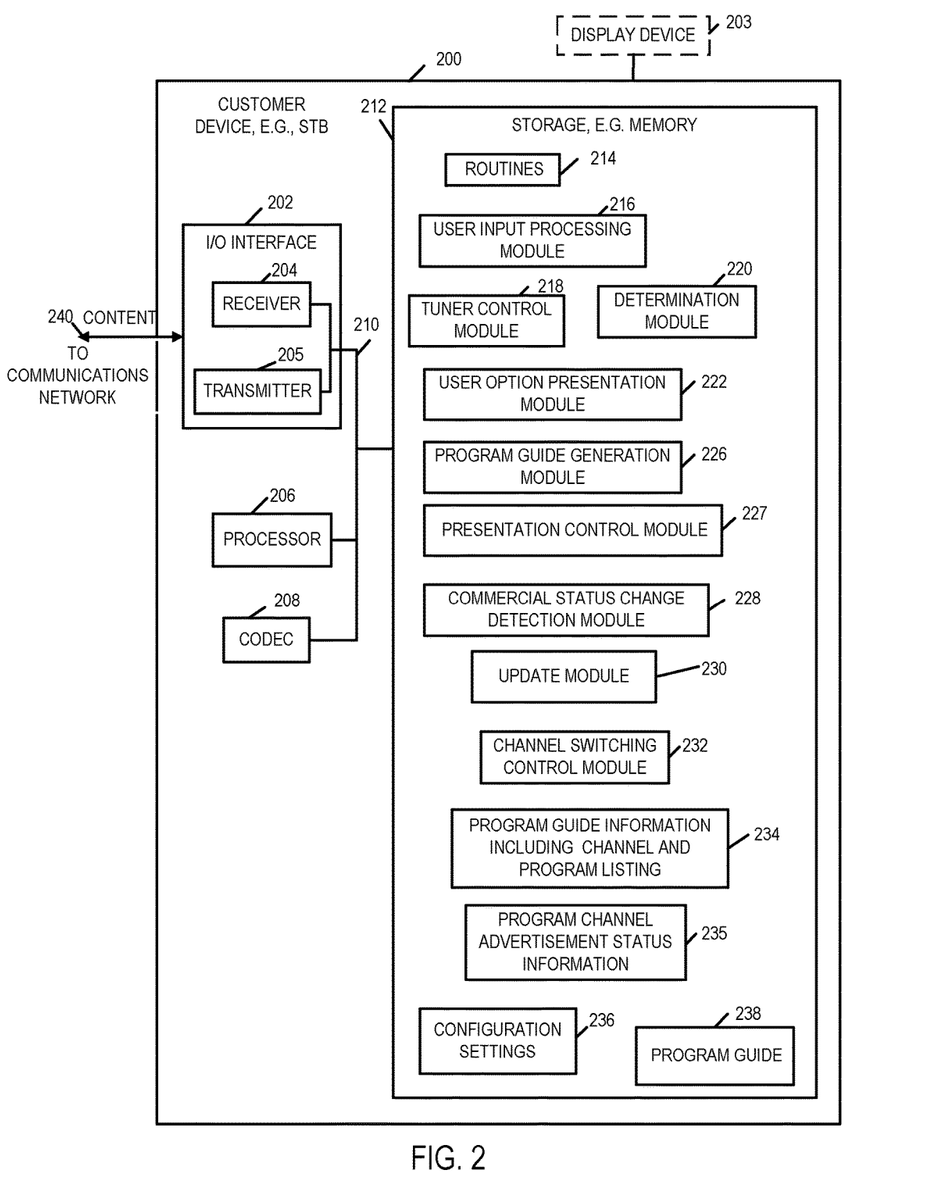
FIG. 2 illustrates an exemplary user device, e.g., set top box, which may be used in the exemplary communications network of FIG. 1 and which supports channel surfing and the indication of a program channel's commercial status in various embodiments.

FIG. 2 illustrates an exemplary customer device, e.g., set top box (STB), 200 implemented in accordance with one exemplary embodiment in which advertising, e.g., commercial status on a program channel, may be indicated to a user and/or used in controlling channel switching operation, e.g., channel changes which may occur as part of a channel surfing operation during a commercial period of a program channel being viewed. The exemplary STB 200 may be used as one of the user devices in the system 100, e.g., such as the STB 112 of the system shown in FIG. 1. In various embodiments the processor is configured to control the operation of the user device 200 in accordance with the invention. In various embodiments the customer device 200 is configured to implement the method of flowcharts 900 and 1000 to control the operation of the device 200 in accordance with the invention.

As shown, the user device 200 is optionally coupled to a display device 203, e.g., a monitor and/or a Television (TV). The STB 200 includes an Input/Output (I/O) interface 202, a processor 206, a codec (Coder/Decoder) module 208, and a storage device, e.g., a memory 212, coupled together via a bus 210. The various elements of the STB 200 can exchange data and information over the bus 210. Via the I/O interface 202, the STB 200 can exchange signals and/or information with other devices and/or system elements such as the server/storage system 120 in the network headend 102 of region 1, via the communications network 176. The I/O interface 202 supports the receipt and/or transmission of content and/or other information from/to different servers, e.g., the BFS server 124, SDV server 126 etc. To support the receipt and transmission of information, the I/O interface 202 includes a receiver 204 and transmitter 205. The receiver 204 includes a tuner-demodulator. The I/O interface 202 in various embodiments further includes, e.g., an infrared signal receiver to receive signals from a user remote control device. The I/O interface 202 in various embodiments is configured to monitor for user input signals, e.g., from user remote control devices. The user input signals include signals indicating user selection of programs guide, a program listing displayed on the program guide, channel up or down selection etc.

The processor 206, e.g., a CPU, executes routines 214 stored in the memory 212 and, under direction of the routines 214, controls the STB 200 to operate in accordance with the invention. The processor 206 is responsible for controlling the general operation of the set top box 200 including, e.g., presentation of program guides with commercial status indication and/or programs for display. To control the STB 200, the processor 206 uses information and/or routines including instructions stored in memory 212. Routines 214 include communications routines and set top box control routines. The Codec 208 is capable of performing encoding and/or decoding operations on a digital data stream or signal.

In addition to the routines 214, the memory 212 includes a user input processing module 216, a tuner control module 218, a determination module 220, a user option presentation module 222, a program guide generation module 226, a presentation control module 227, a commercial status change detection module 228, an update module 230, a channel switching operation control module 232, program guide information 234, program channel commercial status information 235, user configuration settings 236, and program guide 238. The program channel commercial status information 235 includes information on program channels and information indicating whether they are currently in a commercial break, e.g., an advertising period, or normal program period. The commercial status can be determined from examining the program content, metadata indicating the presence and/or location of advertisements in the program content received on a program channel or through other techniques such as the out of band communication, e.g., IP based communication, of a commercial schedule for one or more program channels that may be provided by a network headend or advertising server to the set top box.

User input processing module 216 is configured to process detected user input signals, e.g., from a control device such as remote control 116. Signals from the remote control may be received via I/O interface 202 which includes, in addition to a cable network interface, an IR (infrared) or radio interface for receiving signals from a remote control device. The module 216 determines, on receipt of a signal, e.g., control signal providing user input, as to what type of control signal is received and/or what type of selection has been made by the user, e.g., channel up/down selection, a program guide selection, a channel selection, menu/settings selection, etc.

The tuner control module 218 is configured to control a tuner-demodulator in the device 200 to tune to a frequency corresponding to a program channel to be displayed. In some embodiments the tuner control module 218 consults the program guide information 234 including channel information received from the headend 102 to determine the frequency corresponding to the user selected channel so that the tuner can tune to the correct frequency.

The determination module 220 is configured to determine commercial status of program channel in accordance with the features of invention, e.g., determine if an advertisement is ongoing on a program channel or not. The determination module 220 is configured to determine the commercial status of the current program channel being output, e.g., determining if a commercial is ongoing on the current program channel. In some embodiments the determination module 220 is further configured to determine commercial status of a first program channel, e.g., a channel adjacent, in terms of channel number, the current channel to which a user is tuned, and commercial status of additional program channels. This may and sometimes does include determining, on a per additional program channel basis, if a commercial is ongoing on the additional channels.

The user option presentation module 222 supports and facilitates the interaction between the STB 200 and the user operating STB 200. The user option presentation module 222, in some embodiments, controls presentation of prompts/interactive messages to the user of the STB 200 on the display device 203, providing the user an opportunity to select and respond to a presented option. For example, in some embodiments following a user input signal detection indicating that the user has requested to view program guide the user option presentation module 222 is configured to present an option to the user to choose between a first, e.g., basic program guide or a second, e.g., commercial status indicator capable program guide, for display. The user's response to the prompts are detected and the processor 206 controls the STB 200 to perform the functions in accordance with the user's responses. In various embodiments various other interactive messages discussed earlier are presented to the user by the user option presentation module 222 in accordance with the features of the invention.

The program guide generation module 226 is configured to generate program guide. The program guide generation module 226 uses program guide information 234 including the program and channel listing information and program channel advertisement status information 235 received from the headend 102 to generate the program guide 238 which is the output of module 226. In some embodiments the program guide information 234 includes a listing of channels and programming content scheduled to be on those channels along with on air scheduled timing information for the programming content as well as other relevant information used by the STB 200 in obtaining the programming content.

The presentation control module 227 is configured to control presentation of a program guide, e.g., regular basic program guide or program guide with advertisement status indication and/or other relevant information, in accordance with the features of the invention. In some embodiments the user can configure the device 200 to display the program guide with advertisement status indication such as the ones shown in FIGS. 3-4, whenever the user requests presentation of a program guide, e.g., when program guide button is pressed on the remote control. In some embodiments the presentation control module 227 is configured to provide, in response to a user selection of a program guide, a visual indication of per channel commercial status on a program guide presented to the user. In some embodiments when the user indicates that a regular basic program guide be presented, e.g., in response to a prompt presented to the user, the presentation control module 227 is configured to present a basic program guide for display. In some embodiments the presentation control module 227 controls presentation of commercial status information corresponding to previously viewed program channels to the user while the user flips through various program channels and/or when user changes from a first channel to another channel. This will become clearer when considered in view of the discussion of FIGS. 6-8.

The commercial status change detection module 228 is configured to monitor program channels to detect a change in the determined per program channel commercial status. This can be detected in a variety of ways. In some embodiments the commercial status change is detected by monitoring or looking up the program channel commercial status information 235 which may have been received by the STB 200 from a server, e.g., in the headend 102 or another external server. In some other embodiments this can be based on monitoring of program content stream and/or metadata corresponding to the program channel which includes information indicating the start/end times and/or duration of commercials on the channel.

The update module 230 is configured to update stored per program commercial status information 235. In some embodiments, information 235 includes on a per program channel basis, information indicating whether a commercial break and thus advertisement is ongoing on the channel or not. In some embodiments the commercial status information maybe updated based on updated information and/or metadata corresponding to commercials on one or more program channels received from the headend 102 or another control device. In some embodiments the commercial status information is updated based on a detected change in the determined per program channel commercial status by the commercial status change detection module 228. In some embodiments the presentation control module 227 is further configured to change, when program guide is displayed, the commercial status of one or more program channels to reflect a detected change in the commercial status of the one or more channels, e.g., as may be indicated by the change detection module 228.

Figure 10:
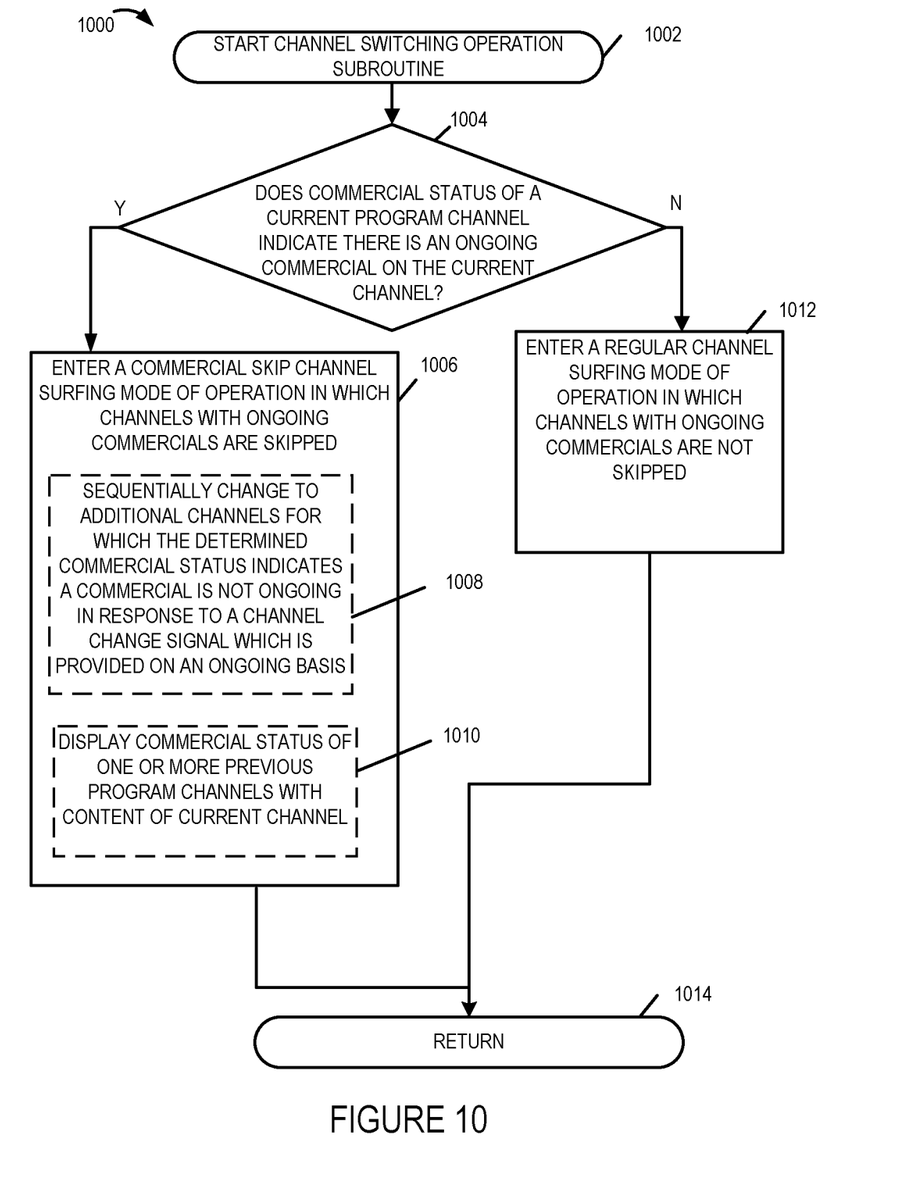
FIG. 10 illustrates an exemplary channel switching subroutine which may be called by the method shown in FIG. 9.

The channel switching operation control module 232 is configured to control, in response to a user input indicating channel up/down selection, a channel switching operation based on the determined commercial status on program channels. As part of controlling the switching operation the channel switching operation control module 232 is configured to control the device 200 to implement the steps of flowchart 1000. Thus in some embodiments the switching operation control module 232 controls the device 200 to skip channels with ongoing commercials while channels are switched from one to another. In some embodiments the control module 232 is configured to check commercial status of a current program channel at the time a channel switch operation is initiated to determine if a commercial channel skip mode of operation should be used or a regular channel change mode of operation should be used. If it is determined from commercial status information corresponding to the current program channel that a commercial is not ongoing on the current program channel, in some embodiments a regular channel surfing mode of operation is entered in which channels with ongoing commercials are not skipped and channel changes are made in sequential channel number order in the channel number direction corresponding to the up or down change signal that was received.

If it was determined that the commercial status of the current program channel indicated that a commercial was ongoing at the time the channel change signal was received, in some embodiments a commercial skip channel surfing mode of operation is entered in which channels with ongoing commercials will be skipped while surfing. In some embodiment this includes changing channels sequentially to channels for which it is determined that the channel commercial status indicates that a commercial is not ongoing with the change in channels being in accordance with the number order indicated by the use of the up channel number change button or down channel button on the remote control. In some embodiments the control module 232 controls displaying, e.g., on display 203, of the commercial status of one or more previous program channels with the content of the current program channel.

Program guide information including channel and program listing 234 is received from the headend 102 and is used by the program guide generation module 224 to generate the program guide 238.

The user configuration settings 236 are stored in the memory 212 and may be updated upon detecting a change in the settings, e.g., made by the user and/or a temporary change by another element of user device 200 in accordance with the invention. The configuration settings information 236 include, among other things, guide 238 settings indicating the user preference for presentation of regular basic program guide or program guide with commercial status indicator such as the ones shown in FIGS. 3-4.

In some embodiments various modules in the user device 200 are implemented fully in hardware within the processor 206, e.g., as individual circuits. In other embodiments some of the modules are implemented, e.g., as circuits, within the processor 206 with other modules being implemented, e.g., as circuits, external to and coupled to the processor 206. Alternatively, in some other embodiments rather than being implemented as circuits, all or some of the modules may be implemented in software and stored in the memory of the user device 200 with the modules controlling operation of the user device 200 to implement the functions corresponding to the modules when the modules are executed by a processor, e.g., processor 206.

In still other embodiments, various modules are implemented as a combination of hardware and software, e.g., with a circuit external to the processor 206 providing input to the processor 206 which then under software control operates to perform a portion of a module's function.

While shown in the FIG. 2 embodiment as a single processor 206, e.g., computer, within device 200, it should be appreciated that processor 206 may be implemented as one or more processors, e.g., computers. When implemented in software, the modules include code, which when executed by the processor 206, configure the processor, e.g., computer, to implement the function corresponding to the module. In some embodiments, processor 206 is configured to implement each of the modules.

Completely hardware based or completely software based modules may be used. However, it should be appreciated that any combination of software and hardware (e.g., circuit implemented) modules may be used to implement the functions. As should be appreciated, the modules shown in FIG. 2 control and/or configure the user device 200, e.g., a Set Top Box, or elements therein such as the processor 206 to perform various operation in accordance with the invention.

Figure 3:
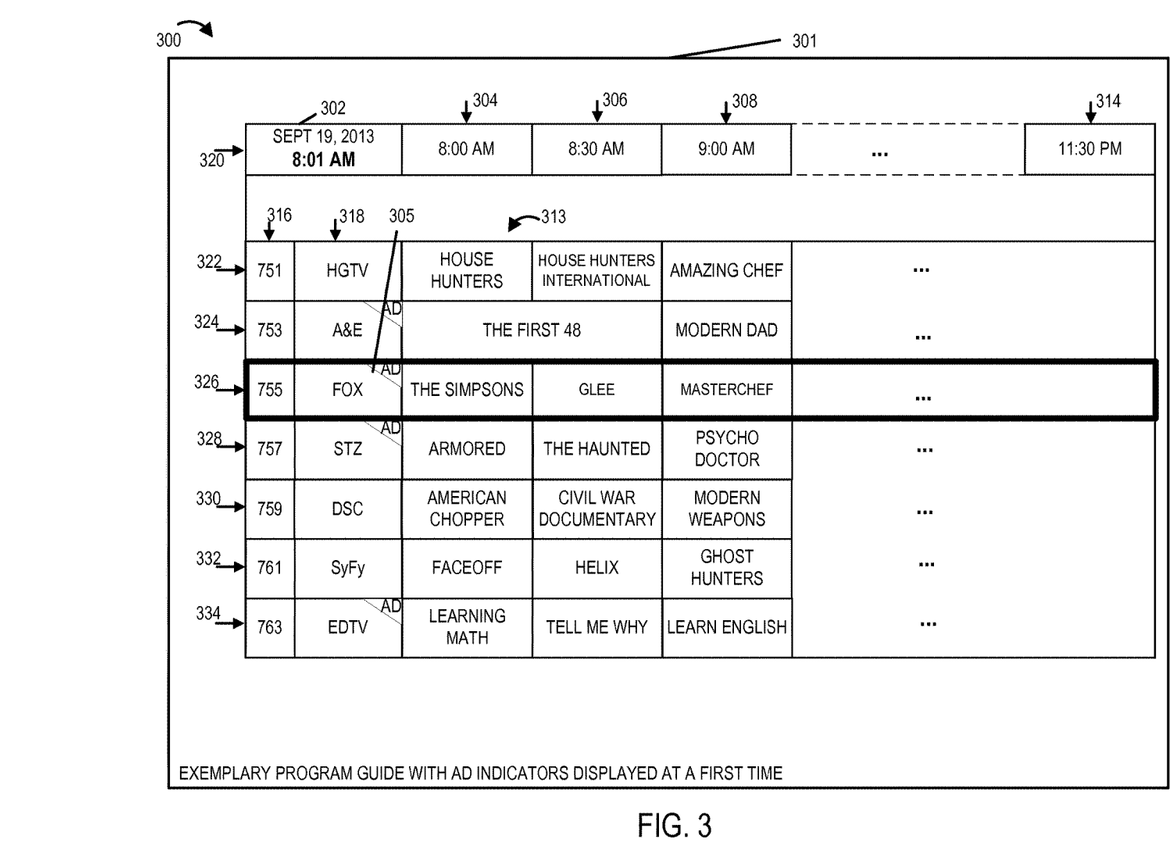
FIGS. 3 and 4 illustrated program guides on which advertising status is indicated in addition to providing information about the programs on the listed channels.
Figure 4:
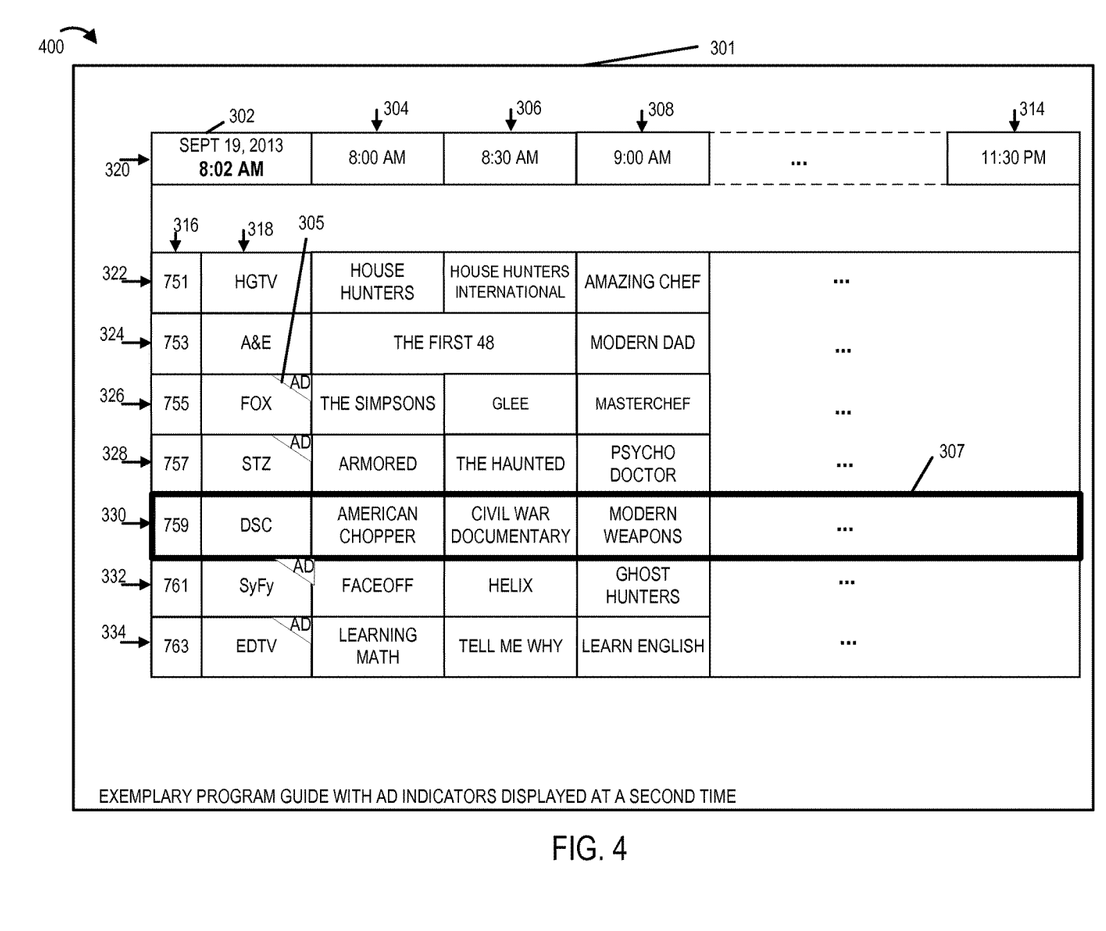

FIGS. 3 and 4 illustrate program guides 300, 400, respectively, on which channel advertising status is indicated in addition to providing information about the programs on the listed channels. In the FIG. 3 example, the program guide 300 is displayed, e.g., on a TV screen or other display 301. The program guide 300 is presented in a grid format. With the exception of the first row 320, each of the subsequent rows corresponds to a different program channel with the channel number indicated in column 316. The first row 320 includes date and current time information in the first cell 302 with each of the subsequent cells corresponding to a different column of the guide where each column corresponds to a different time slot. For example cell 304 corresponds to the 8 AM time slot and programs listed there while cell 306 corresponds to an 8:30 time slot and the programs listed there under. Similarly cell 308 corresponds to the 9 AM time slot and cell 314 to an 11:30 PM time slot. The programs listed under the time slot cells 304, 306, 308 etc. represent the title of programs which can be viewed during the respective time slots. Fewer or more time slots may be displayed depending the display area and the particular embodiment.

Each row 322, 324, 326, 328, 330, 332, 334 corresponds to a different program channel with the channel number being indicated in column 316, the name of the channel being indicated in column 316 and the programs available on the channel in the different times slots being shown to the right of the channel number and channel name. For example, row 322 provides information for channel 751 which is the HGTV channel and which has the program House Hunters on in the 8 AM to 8:30 AM time slot 304, House Hunters International during the 8:30 to 9 AM time slot 306 and amazing chef in the 9 AM to 9:30 AM time slot 308. The information continues for other time slots as represented by the . . . found at the end of the row 322. Similar information is provided for the other rows 324, 326, 328, 330, 332, 334. Notably in accordance with various embodiments, the current commercial/advertisement status is indicated for the programs in the current time slot. In particular if an advertisement is currently being displayed on a given channel, the indicator AD 305 is included in the corner of the cell that includes the channel name. Absence of the indicator AD indicates that an advertisement is not currently ongoing on the program channel and thus the absence of the indicator provides a visual indication that a program rather than an advertisement is ongoing on the channel. The time in cell 302 and the commercial status indicators on the program channels will be updated as the time changes and a program channel switches from a commercial break to a program time period.

From a review of the program guide 300 it can be seen that program channels 753, 755, 757 and 763 are within a commercial break at time 8:01 AM which it the current time for which the program guide information is displayed. The dark box 307 is used to indicate the current channel selection on the guide and/or current channel being output, e.g., displayed, to a user of the user device, e.g., STB, which generated the program guide 300.

The guide 300 may be, and in some embodiments is, generated and displayed when the user presses the guide button on a remote control while watching program channel 755. Thus in at least some embodiments, the guide 300 is displayed in response to a guide control signal received from a remote control which sends the signal in response to user input.

FIG. 4 illustrates a program guide 400 at time 8:02 AM one minute after the guide 300 is displayed. The content of guide 400 is similar to that of guide 300 3 but note that the information in the guide has been updated to reflect the new current time 8:02 and the change in commercial status of various program channels and the result of a user using an up arrow to switch channels from channel 755 to the next higher numbered channel. Note that the channels increase in number order towards the bottom of the guides 300 and 400 and thus an up channel indication will cause a switch to a higher numbered channel located lower down towards the bottom of the guide 400. Note that at time 8:02 the Syfy channel commercial status indicator has been changed to show that an advertisement is ongoing as indicated by the AD indicator and channel 753 A&E has changed (e.g., AD is no longer displayed) to reflect that an AD is no longer being presented on the A&E channel.

In accordance with the commercial channel skip feature implemented in some embodiments, when the user presses the change channel arrow button during a commercial on a current channel the set top box will move in the direction (channel number direction) indicated by the user channel change arrow, in response to a channel change control signal, to the next channel which is not displaying an advertisement. For example with reference to FIG. 3, by pressing the channel up arrow on the remote at time 8:01 the user will skip from the current channel 755 shown in FIG. 3 to the next higher numbered channel 759 which does not have an ongoing commercial as determined from the commercial state information by skipping over the STZ channel 757 which has an ongoing commercial. Thus, channel 757 is skipped in the transition to the next higher number channel since an Ad is being displayed on that channel as shown in FIG. 3 at the time the channel change is initiated. This skipping of channels on which commercials are ongoing allows for pleasurable channel surfing during a period of a commercial break on the channel from which the channel surfing operation was initiated.

As will be discussed below as a channel to which a switch is made is displayed, previous channel information may also be displayed along with commercial status information. A user can then switch between recently visited channels based on knowledge of the commercial status of each channel and easily determine an appropriate time to switch back to the original channel. The channels may be buffered briefly and the user may, in some embodiments does, switch back to the original channel at a point where the commercial break on the original channel from which the channel surfing operation was initiated ended. However, in other embodiments buffering is not supported and channel switches are limited to real time output.

Various features of the invention will now be explained with references to FIGS. 5 through 8B which show various screen displays corresponding to different points of time and different stages of a channel surfing operation implemented in accordance the invention.

Figure 5:
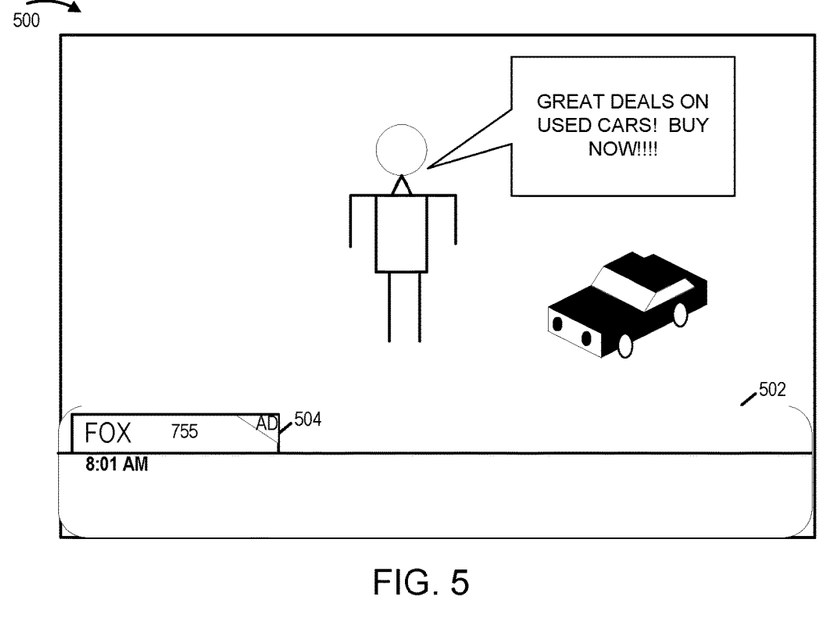
FIG. 5 illustrates content of a program channel which is currently communicating an advertisement being displayed on a display screen with a program channel indicator and commercial, e.g., advertising, status indicator being displayed toward the bottom of the display area.

FIG. 5 shows a screen shot 500 showing content of program channel 755 (e.g., FOX channel) at time 8:01 AM with the channel, current time and commercial status being indicated in the information block 502 at the bottom portion of the display. Note that in current channel information block 504, the commercial status indicator includes the AD indicator indicating that a commercial break is ongoing on channel 755. In the upper portion of the display 500 the content of the advertisement presently being received on channel 755 and displayed is shown.

Figure 6:
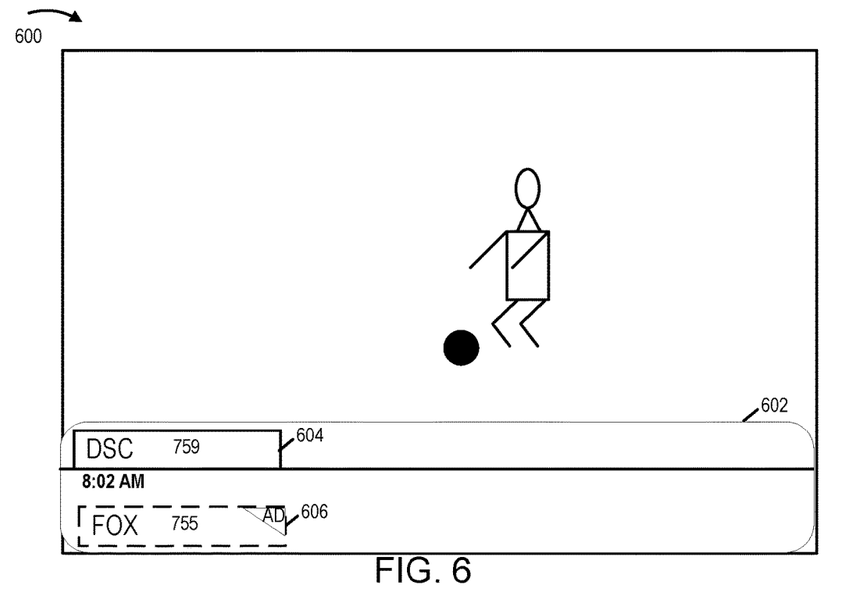
FIG. 6 illustrates content communicated on a program channel being displayed after switching to the program channel during the advertisement shown in FIG. 5.

FIG. 6 shows a screen shot 600 corresponding to time 8:02 AM after the user initiates an up channel number channel change at time 8:01 AM causing the STB to skip to channel 759 bypassing channel 757 which has an AD ongoing at time 8:01 and 8:02 AM. Not that in the FIG. 6 example, the current channel and its commercial status is indicated in block 604 at the bottom of the screen in information section 602 of the display and information corresponding to the previous channel 755 and its advertisement status at time 802 is shown in block 606. Thus, a user who skipped to channel 759 during the commercial break on channel 755 is kept informed to the commercial status of the original channel from which the channel surfing operation was initiated. In some embodiments a count down time indicating the amount of time to the end of the AD on channel 755 is also included in block 606 allowing a user to easily determine when he/she should switch back from the new channel to the previous channel.

Figure 7:
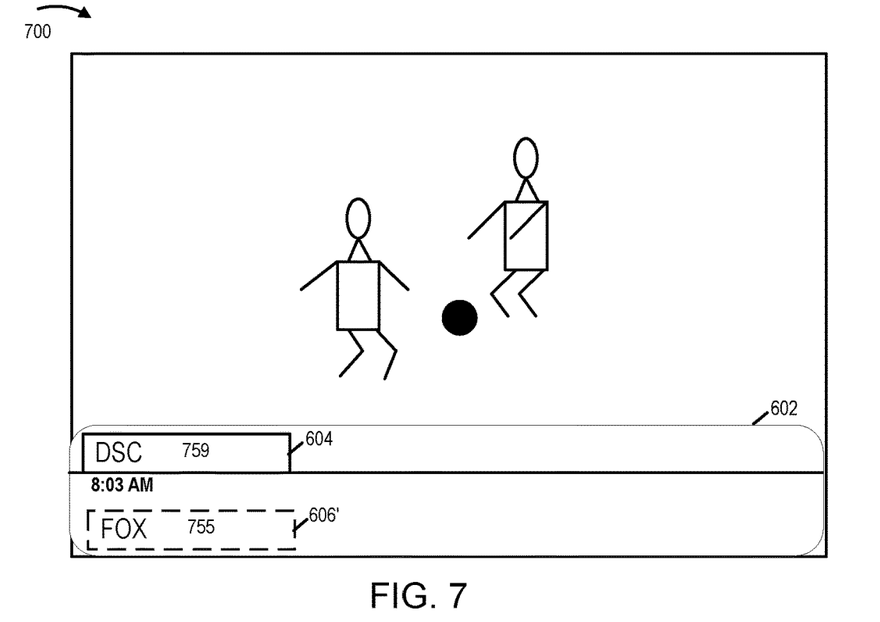
FIG. 7 illustrates content communicated on the same program channel as shown in FIG. 6 and displayed on the screen but with the content being received at a later time during which the advertisement on the previously visited program channel is over and the previously visited channel is no longer in a commercial break as indicated by a advertisement status indicator.

FIG. 7 illustrates a screen shot 700 showing the content and the status of the program channel 759 at time 8:03 AM while the user is still on channel 759. As can be seen in information block 606' corresponding to the original channel (e.g., FOX 755 in this example), the AD indicator has been removed since the commercial break on channel 755 has ended by time 8:03 AM to which the screen shot 700 corresponds. Thus, while still tuned to the new channel 759 the user can see that the commercial break on the original channel 755 has ended and the user can now switch back to the original channel, e.g., via a input on the remote control such as a channel number input or a switch back to last channel input.

Figure 8A:
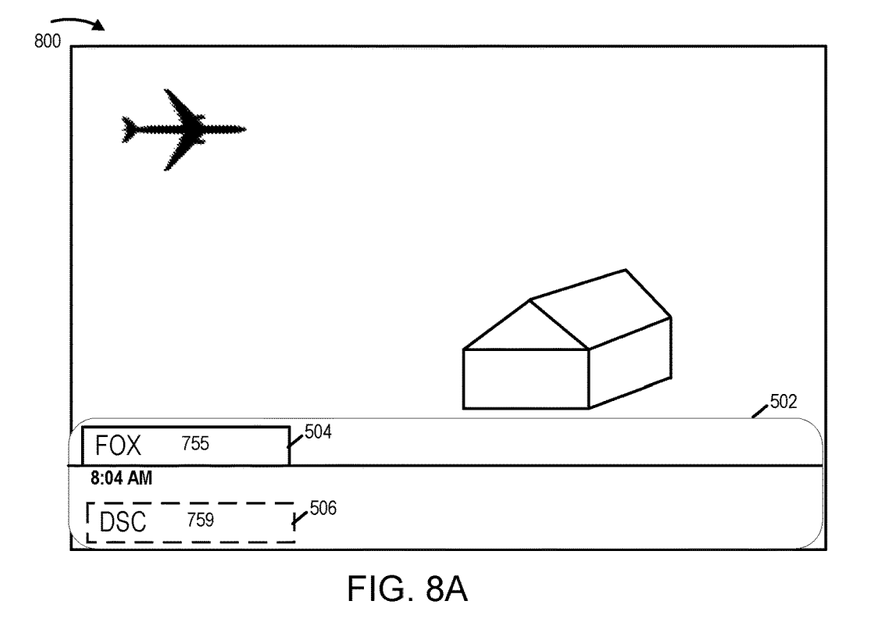
FIG. 8A illustrates content communicated on the original program channel which is the same as the program channel used during the time period to which FIG. 5 corresponds after switching back to the original program channel after the end of the commercial break.

FIG. 8A illustrates a screen shot 800 showing content of program channel 755 displayed at time 8:04 AM after the switch back to the original program channel 755 after channel surfing to channel 759 during the commercial break on channel 755. Note that channel 759 is now indicated in block 506 as being a previous channel and no commercial is ongoing on either channel 755 or channel 759.

Figure 8B:
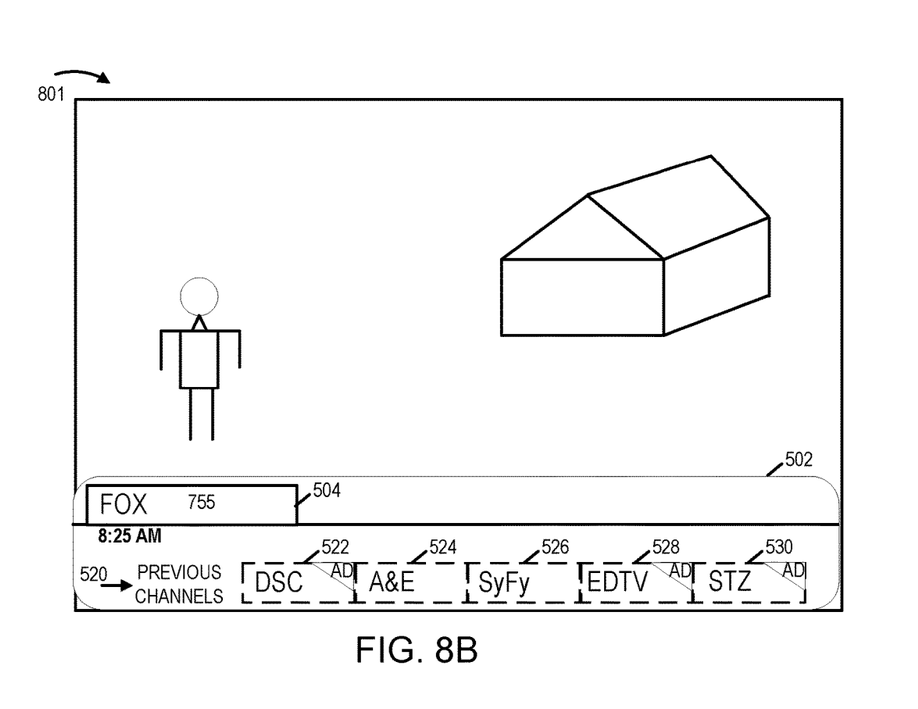
FIG. 8B illustrates content communicated on the original program channel which is the same as the program channel used during the time period to which FIG. 5 corresponds after switching back to the original program channel after the end of the commercial break with previous channel information being shown at the bottom of the display along with commercial status for those channels as is done in some embodiments.

FIG. 8B illustrates a screen shot 801 showing the content being displayed on program channel 755 to the user at time 8:25 AM by which time the user has switched between numerous channels as indicated by the list of previous channels 522, 524, 526, 528, 530 shown in the previous channel information row 520. Note that current commercial status information is provided for each channel in the previous channels list 520 so that a user can see which channels have ongoing commercials at time 8:25 AM and which do not have ongoing commercials.

Figure 9:
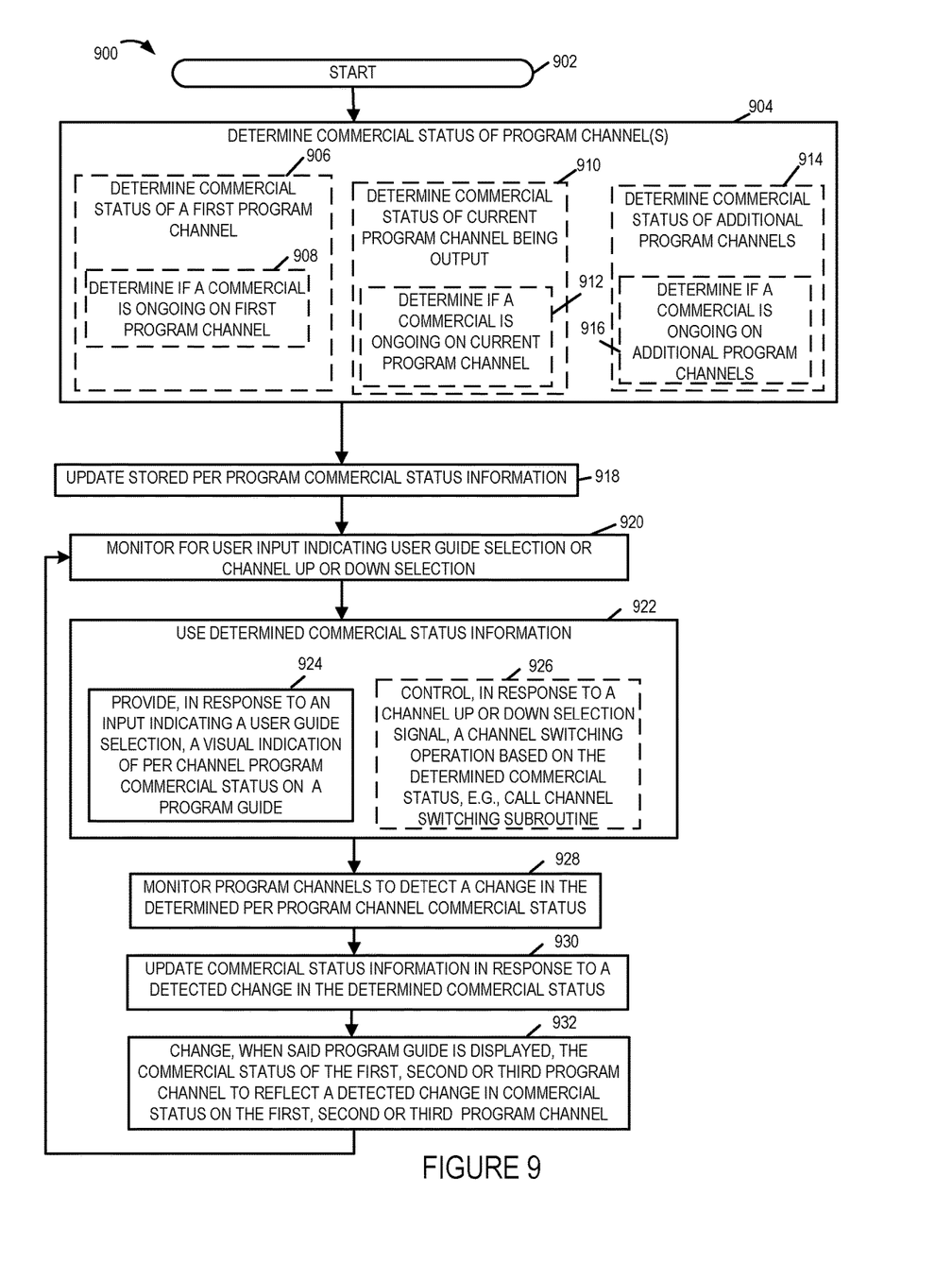
FIG. 9 illustrates the steps of a method of providing access to program channels in accordance with one exemplary embodiment wherein advertisement status, e.g., whether an advertisement is being presented on a program channel at a given time, is indicated to a user.

FIG. 9 illustrates the steps of a method 900 of providing access to program channels in accordance with one exemplary embodiment wherein commercial status on a program channel, e.g., whether an advertisement is being presented on a program channel at a given time, is indicated to a user. As should be appreciated from the above discussion, at least in some embodiments when a channel surfing operation is initiated from a program channel during a commercial break, channels with ongoing commercials will be skipped. However, when a channel surfing operation is initiated during presentation of a program, channels with commercials will not be skipped in some embodiments with regular up/down channel change responses being provided and channels being displayed without skipping or regard to commercial status on the channels.

The method 900 begins in start step 902 with the customer device, e.g., STB 112 being initiated and powered on. Operation proceeds from step 902 to step 904 wherein the commercial status of program channel(s) is determined. In some embodiments this involves determining if an advertisement is ongoing on the program channel or not. Such a determination can be made in a variety of ways including based on the received content of the program channel, based on metadata corresponding to the program channel or based on received information about the time and duration of commercial breaks on program channels that may be received from a server or other device which supplies such information to the STB.

Step 904 includes in at least some embodiments steps 906, 910 and 914. In step 906 the commercial channel status of a first program channel, e.g., a channel adjacent, in terms of channel number, the current channel to which a user is tuned, is checked. This may and sometimes does involve step 908 wherein a determination is made at to whether a commercial is ongoing on the first program channel. Step 904 may and sometimes does also include step 910 in which the commercial status of the current program channel being output is determined. This may include step 912 which includes determining if a commercial is ongoing on the current program channel. Step 904 may also include step 914 in which the commercial status of additional program channels is determined. This may and sometimes does include step 916 which involves, on a per additional program channel basis, determining if a commercial is ongoing on the additional channels.

Operation proceeds from step 904 to step 918 in which stored per program commercial status information is updated. This may, and in some embodiments does, include updating program channel advertisement status information 235 stored in memory. In some embodiments, information 235 includes on a per program channel basis, information indicating whether a commercial break and thus advertisement is ongoing on the channel or not. Thus, based on program channel advertisement status information 235 the STB can easily determine which programs should have an AD indicator associated with them at a given time and which should not have an AD indicator shown in association with the indicator of the program channel.

Operation proceeds from step 918 to step 920 wherein the customer device, e.g., STB, monitors for user input indicating a user guide selection which can be used to trigger presentation of a program guide such as the one shown in FIGS. 3 and 4, or a channel change up or down selection which can be used to initiate a channel surfing operation in a channel up or down channel number direction. A surfing operation may proceed while the channel change up or down arrow is depressed on a remote causing a channel change signal to be sent continuously.

Operation proceeds from step 920 to step 922 in which the commercial status information is used, e.g., to generate and present a program guide in step 924 in response to a guide signal or control a channel change operation which may be performed in step 926 in response to a channel up or down change signal.

In the case of a detected user guide selection, e.g., detection of a guide signal from a remote control, in step 924, which is part of step 922, a visual indication of per channel commercial status is indicated on a program guide which is presented in response to a guide selection, e.g., depressing of a program guide button on a remote control.

In case of a detected channel up or down selection by a user, step 926 is performed. In step 926 a channel switching operation based on the determined commercial status information is performed. This may involve skipping channels with ongoing commercials. Step 926 may involve a call to a channel switching subroutine such as the exemplary subroutine 1000 shown in FIG. 10.

The channel switching routine 1000 shown in FIG. 10 will now be described briefly before returning to the discussion of FIG. 9. The channel switching subroutine 1000 starts in step 1002 when called by another routine, e.g., from step 926 of FIG. 9.

In step 1004 the commercial status of the current program channel at the time the channel switch operation is initiated is checked to determine if a commercial channel skip mode of operation should be used or a regular channel change mode of operation should be used. If in step 1004 it is determined from commercial status information corresponding to the current program channel that a commercial is not ongoing on the current program channel, operation proceeds to step 1012 in which a regular channel surfing mode of operation is entered in which channels with ongoing commercials are not skipped and channel changes are made in sequential channel number order in the channel number direction corresponding to the up or down change signal that was received. Operation proceeds from step 1012 to return step 1014.

If in step 1004 if it was determined that the commercial status of the current program channel indicated that a commercial was ongoing at the time the channel change signal was received, operation proceeds to step 1006 in which a commercial skip channel surfing mode of operation is entered in which channels with ongoing commercials will be skipped while surfing. Step 1006 may, and sometimes does includes steps 1008 and 1010. In step 1008 a change is sequentially made to channels for which it is determined that the channel commercial status indicates that a commercial is not ongoing with the change in channels being in accordance with the number order indicated by the use of the up channel number change button or down channel button on the remote control. In step 1010, the commercial status of one or more previous program channels is displayed with the content of the current program channel. FIGS. 8A and 8B show displays which may be generated in accordance with step 1010.

Operation proceeds from step 1006 to return step 1014. From return step 1014 operation returns to the point in the routine from which subroutine 1000 was called, e.g., to step 922 of FIG. 9.

Returning to the discussion of FIG. 9, it can be seen that operation proceeds from step 922 to step 928 wherein the customer premise device, e.g., STB, monitors program channels to detect a change in the determined per program channel commercial status information. Operation proceeds from step 928 to step 930 in which the commercial status information, e.g., information 235 stored in memory, is updated in response to one or more detected changes in program channel commercial status. For example with reference to FIGS. 3-4, in step 930 the information corresponding to channel 753 may be changed from the status of an ongoing AD shown in FIG. 3 to the status of no AD shown in FIG. 4.

Operation proceeds from step 930 to step 932 in which the commercial status of the first, second or additional program channels is updated to reflect the current status of the commercials on the individual channels as reflected in any detected change. For example step 932 causes the AD indicator associated with channel 753 to be removed in response to detecting that an AD is no longer ongoing on channel 753.

Operation proceeds from step 932 back to monitoring step 920 which is performed on an ongoing basis.

It should be appreciated that in accordance with the method shown in FIG. 9 user input such as guide display selections, channel up or down selections or other input will be determined and processed on an ongoing basis. Also changes in commercial status of a program channel will be detected on an ongoing basis and the commercial status information updated to reflect whether or not an advertisement is being presented on a program channel at a given point in time.

An exemplary method of providing access to channels implemented in accordance with an embodiment of the invention comprises: determining a commercial status on a first program channel; and using said determined commercial status of the first program channel to perform at least one of i) providing a visual indication of program commercial status or ii) controlling a channel switching operation based on the determined commercial status.

An exemplary customer device, e.g., a set top box, implemented in accordance with an embodiment of the invention comprises: memory storing commercial status information indicating commercial status on a plurality of program channels; and at least one processor configured to: determine a commercial status on a first program channel, and use said determined commercial status of the first program channel to perform at least one of i) providing a visual indication of program commercial status or ii) controlling a channel switching operation based on the determined commercial status.

In some embodiments the at least one processor is further configured to determine if a commercial is ongoing on the first program channel as part of determining the commercial status on the first program channel. In some embodiments the at least one processor is further configured to provide a visual indication of program commercial status of the first program channel on a guide, as part of being configured to use said determined commercial status of the first program channel, said status indication indicating when a commercial is ongoing on the first program channel.

The above described methods and apparatus allow channel surfing to be performed during a commercial break without the user having to suffer through flipping to channels with ongoing advertisements, making for a more pleasurable channel surfing experience than systems where ongoing advertisements status is not tracked or taken into consideration when skipping from one channel to another Numerous variations on the above described embodiments are possible.

While a logical sequencing of the processing steps of the exemplary embodiments of the methods, routines and subroutines of the present invention have been shown, the sequencing is only exemplary and the ordering of the steps may be varied.

The techniques of various embodiments may be implemented using software, hardware and/or a combination of software and hardware. Various embodiments are directed to apparatus, e.g., a media content distribution system. Various embodiments are also directed to methods, e.g., a method of controlling the distribution of media content, e.g., video on demand audio and/or video content. Various embodiments are also directed to non-transitory machine, e.g., computer, readable medium, e.g., ROM, RAM, solid state storage, silicon storage disks, CDs, hard discs, etc., which include machine readable instructions for controlling a machine to implement one or more steps of a method. In some embodiments devices, elements and/or modules that are configured to perform various functions are implemented as circuits, e.g., with a different circuit for each function being implemented in some but not necessarily all embodiments.

Various features of the present invention are implemented using modules. For example each of the various routines and/or subroutines disclosed may be implemented in one or more modules. Such modules may be, and in some embodiments are, implemented as software modules. In other embodiments the modules are implemented in hardware, e.g., in circuitry, ASICs, ICs, etc. In still other embodiments the modules are implemented using a combination of software and hardware. A wide variety of embodiments are contemplated including some embodiments where different modules are implemented differently, e.g., some in hardware, some in software, and some using a combination of hardware and software. It should also be noted that routines and/or subroutines, or some of the steps performed by such routines, may be implemented in dedicated hardware as opposed to software executed on a general purpose processor. Such embodiments remain within the scope of the present invention. Many of the above described methods or method steps can be implemented using machine executable instructions, such as software, included in a machine readable medium such as a memory device, e.g., RAM, floppy disk, solid state storage device, silicon storage device, etc. to control a machine, e.g., general purpose computer with or without additional hardware, to implement all or portions of the above described methods. Accordingly, among other things, the present invention is directed to a machine readable medium including machine executable instructions for causing a machine, e.g., processor and associated hardware, to perform one or more of the steps of the above described method(s).

Numerous additional variations on the methods and apparatus of the various embodiments described above will be apparent to those skilled in the art in view of the above description. Such variations are to be considered within the scope of the invention.

What is claimed is:

1. A method of providing access to channels, the method comprising:
   determining a commercial status on a first program channel;
   using said determined commercial status of the first program channel to provide a visual indication of program commercial status on a program guide; and
   wherein using said determined commercial status of the first program channel includes providing a visual indication of program commercial status of the first program channel on the program guide, said program guide including listings for multiple different program channels and time slots, said status indication of the first program channel indicating in a portion of the guide corresponding the first program channel when a commercial is ongoing on the first program channel; and
   wherein the program guide includes separate individual commercial status information for multiple program channels at the same time, an individual advertisement indicator being provided on a per program channel basis for channels on which an advertisement is ongoing.

2. The method of claim 1,
wherein the method further comprises:
monitoring the first program channel to detect a change in the determined commercial status; and
updating commercial status information corresponding to said first program channel in response to a detected change in the determined commercial status.

3. The method of claim 2, wherein said program guide includes program channels listed in channel number order, program channels with an individual advertisement indicator indicating an advertisement is being output being interspersed with program channels on which a program channel is not being output, the method further comprising:
changing the displayed commercial status corresponding to said first program in said program guide to reflect a detected change in commercial status.

4. The method of claim 3, wherein using said determined commercial status of the first program channel includes:
skipping said first program channel in response to a channel up or down command when said determined commercial status of the first channel indicates a commercial is ongoing.

5. The method of claim 4, wherein using said determined commercial status of the first program channel includes changing to said first program channel in response to a channel up command when said first program channel is the next channel in the up channel change direction and said determined commercial status of the first channel indicates that a commercial is not ongoing on the first channel.

6. The method of claim 5, further comprising:
determining the commercial status of additional program channels; and
responding to a channel up or down command, said responding including skipping additional channels for which the determined commercial status indicates a commercial is ongoing on the channel.

7. The method of claim 6, wherein responding to a channel up or down command includes sequentially changing to additional channels for which the determined commercial status indicates a commercial is not ongoing in response to a channel change signal which is provided on an ongoing basis.

8. The method of claim 1, further comprising:
detecting, at a time, a channel change up or down signal; and
if it is determined that the current channel being output does not have an ongoing commercial at the time said channel change up or down signal was detected, operating in a regular channel surfing mode of operation in which channels with ongoing commercials are not skipped.

9. The method of claim 1, further comprising:
detecting, at a time, a channel change up or down signal; and
automatically controlling whether a commercial skip channel surfing mode of operation is entered or a regular channel surfing mode of operation is entered based on whether the current channel being output at the time the channel change up or down signal was detected has an ongoing commercial or not, said step of automatically controlling including entering, if it is determined that the current channel being output has an ongoing commercial at the time said channel change up or down signal was detected, a commercial skip channel surfing mode of operation.

10. The method of claim 9, wherein the current channel being output is a program channel being displayed to a user.

11. The method of claim 1, wherein said visual indication of program commercial status on the program guide includes a visual indication that an advertisement is ongoing on the first program channel when an advertisement is ongoing on the first program channel.

12. A customer premise device for providing access to program channels, the customer premise device comprising:
memory storing commercial status information indicating commercial status on a plurality of program channels; and
a processor configured to:
determine a commercial status on a first program channel;
use said determined commercial status of the first program channel to provide a visual indication of program commercial status on a program guide; and
wherein using said determined commercial status of the first program channel includes providing a visual indication of program commercial status of the first program channel on the program guide, said program guide including listings for multiple different program channels and time slots, said status indication of the first program channel indicating in a portion of the guide corresponding the first program channel when a commercial is ongoing on the first program channel; and
wherein the program guide includes separate individual commercial status information for multiple program channels at the same time, an individual advertisement indicator being provided on a per program channel basis for channels on which an advertisement is ongoing.

13. The customer premise device of claim 12, wherein said processor is further configured to control the customer premise device to:
monitor the first program channel to detect a change in the determined commercial status; and
update commercial status information corresponding to said first program channel in response to a detected change in the determined commercial status.

14. The customer premise device of claim 13, wherein the processor is further configured to control the customer premise device to:
display with content of a current channel being output, advertisement status of a previous channel that was being output.

15. A non-transitory computer readable medium for use in a customer premise device, said non-transitory computer readable medium including instructions which when executed by a processor control said customer premise device to:
determine a commercial status on a first program channel;
use said determined commercial status of the first program channel to provide a visual indication of program commercial status on a program guide; and
wherein using said determined commercial status of the first program channel includes providing a visual indication of program commercial status of the first program channel on the program guide, said program guide including listings for multiple different program channels and time slots, said status indication of the first program channel indicating in a portion of the guide corresponding the first program channel when a commercial is ongoing on the first program channel; and
wherein the program guide includes separate individual commercial status information for multiple program channels at the same time, an individual advertisement indicator being provided on a per program channel basis for channels on which an advertisement is ongoing.

16. The non-transitory computer readable medium of claim 15, further including instructions which when executed by the processor control said customer premise device to:

monitor the first program channel to detect a change in the determined commercial status; and update commercial status information corresponding to said first program channel in response to a detected change in the determined commercial status.

17. The non-transitory computer readable medium of claim 15, wherein said program guide includes program channels listed in channel number order, program channels with an individual advertisement indicator indicating an advertisement is being output being interspersed with program channels on which a program channel is not being output; and wherein the non-transitory computer readable medium further includes instructions which when executed by the processor control said customer premise device to:

change the displayed commercial status corresponding to said first program in said program guide to reflect a detected change in commercial status.

* * * * *